United States Patent [19]
Mukaiya

[11] Patent Number: 4,812,024
[45] Date of Patent: Mar. 14, 1989

[54] ZOOM LENS

[75] Inventor: Hitoshi Mukaiya, Saitama, Japan

[73] Assignee: Canon Kabushiki Kaisha, Tokyo, Japan

[21] Appl. No.: 190,472

[22] Filed: May 5, 1988

[30] Foreign Application Priority Data

| May 11, 1987 | [JP] | Japan | 62-279831 |
| May 11, 1987 | [JP] | Japan | 62-279832 |
| May 18, 1987 | [JP] | Japan | 62-120724 |
| May 18, 1987 | [JP] | Japan | 62-120725 |

[51] Int. Cl.$^4$ ............................................ G02B 15/14
[52] U.S. Cl. ...................................................... 350/427
[58] Field of Search ................................. 350/423, 427

[56] References Cited

U.S. PATENT DOCUMENTS

| 3,336,094 | 8/1967 | Macher | 350/427 |
| 4,618,220 | 10/1986 | Kato | 350/427 |
| 4,621,905 | 11/1986 | Kato et al. | 350/427 |
| 4,699,474 | 10/1987 | Ozawa | 350/427 |
| 4,720,181 | 1/1988 | Hata | 350/427 |

Primary Examiner—John K. Corbin
Assistant Examiner—Scott J. Sugarman
Attorney, Agent, or Firm—Fitzpatrick, Cella, Harper & Scinto

[57] ABSTRACT

A zoom lens comprising, from front to rear, a first lens unit of positive power for focusing, a second lens unit of negative power as the variator, a third lens unit of negative power as the compensator, an afocal fourth lens of positive power, and a fifth lens unit for image formation, the fifth lens unit including, from front to rear, a bi-convex first lens whose front surface is of stronger curvature, a negative meniscus second lens of forward concavity, a positive third lens whose front surface is of stronger curvature, a negative meniscus fourth lens of forward convexity, a bi-convex fifth lens whose rear surface is of stronger curvature, and a positive sixth lens whose front surface is of stronger curvature, wherein the following conditions are satisfied:

$1.45 < F_1/F_4 < 1.65$
$2.5 < F_4/F_w < 2.8$
$0.75 < |f_{5,4}/F_5| < 1.3$
$0.47 < D_{5,6}/F_5 < 0.65$ where $F_1$, $F_4$ and $F_5$ are the focal lengths of the first, fourth and fifth lens units, $F_w$ is the shortest focal length of the entire system, $f_{5,4}$ is the focal length of the fourth lens, and $D_{5,6}$ is the air separation between the third and fourth lenses.

2 Claims, 5 Drawing Sheets

ZOOM LENS

BACKGROUND OF THE INVENTION

1. Field of the Invention

This invention relates to zoom lenses and, more particularly, to compact large aperture zoom lenses of short total length suited to cameras for photography, video cameras, etc. Still more particularly, it relates to improvement of the optical performance over the entire zooming range at as high an aperture ratio as 1.4.

2. Description of the Related Art

In the field of cameras for photography and video cameras there has been a demand for zoom lenses of large aperture ratio and high range with a high grade of optical performance.

Of these, the video camera, because of its image pickup element being relatively low in sensitivity, has to have a zoom lens of as high an aperture ratio as possible.

Up to now, the ⅔ in. image pickup tube has widely been used in the video cameras from the two standpoints of compactness and image quality. Also, in view of good manageability and a possibility of further reducing the bulk and size, 8 mm video cameras are gradually becoming popular. For adaptation to this type of video cameras, the size of the image pickup tube must be further reduced in such a manner as to maintain good image quality. From this reason, ½ in. tube, or ⅓ in. image pickup device has recently found its use in video cameras.

There have been previous proposals for a zoom lens having an F-number of 1.2–1.4 or thereabout and a zoom ratio of about 6 as, for example, in Japanese Laid-Open Patent Applications Nos. Sho 60-51813, corresponding to U.S. Pat. No. 4,621,905, and Sho 60-260912. What is proposed in that patent is a so-called five-unit zoom lens comprising, from front to rear, a first lens unit of positive power for focusing, a second lens unit of negative power for varying the image magnification, a third lens unit for compensating for the image shift resulting from the variation of the image magnification, a fourth lens unit for making afocal the light beam from the third lens unit, and a fifth lens unit for image formation.

The shortening of the total length of the entire lens system have generally been achieved when the size of the first lens unit is minimized. To this end, the F-number may be increased. But to increase the F-number is not very desirable in the case of video cameras which require that the lens system is of large aperture ratio. If the requirements of decreasing the F-number and of minimizing the bulk and size of the entire system are desired to fulfill at once, it becomes important in any case that the various optical constants of each of the lens units constituting the lens system are taken to appropriate values.

Yet, if the fulfillment of the above-mentioned requirements is relied on the mere method of strengthening the refractive power of each individual lens unit, the spherical aberration in the paraxial region of the image frame, and aberrations in the intermediate to the marginal regions such as coma and higher order aberrations such as sagittal halo are increased largely. Hence it becomes very difficult to obtain a high grade optical performance.

For example, as the refractive power of the front or first lens unit is strengthened and, therefore, the overall image magnification of the second lens unit or variator to the last one for image formation has to be increased, the first lens unit produces many large aberrations which cannot be corrected by the following lens units. Further, the tolerances of manufacturing become severer. Hence, it becomes difficult to preserve the optical performance at a predetermined standard.

Particularly in application to the ½ in. image pickup element, for the effective diameter $\phi_A$ of the image circle, the total length L from the front vertex to the image plane takes a relatively large value of about $L=12.5-14\phi_A$. Thus, it becomes difficult to shorten the total length L in such a manner that good optical performance is maintained. As another related technique, there is U.S. patent application Ser. No. 156,935.

SUMMARY OF THE INVENTION

A first object of the invention is to achieve a minimization of the size of the entire lens system.

A second object is to provide a zoom lens having high grade optical performance over the entire zooming range.

In an embodiment of the invention applied to the zoom lens comprising, from front to rear, a first lens unit of positive power for focusing, a second lens unit of negative power having the function of varying the image magnification, a third lens unit of negative power for compensating the shift of an image plane resulting from the variation of the image magnification, a fourth lens unit of positive power receptive of a diverging light beam from the third lens unit for producing an almost afocal light beam, and a fifth lens unit having the function of forming an image, the following rules of design are set forth The fifth lens unit comprises, from front to rear, a first lens of bi-convex form turning its strong refracting surface toward the front, a negative meniscus-shaped second lens of forward concavity, a positive third lens turning its strong refracting surface toward the front, a negative meniscus-shaped fourth lens of forward convexity, a bi-convex fifth lens turning its strong refracting surface toward the rear, and a positive sixth lens turning its strong refracting surface toward the front, and the following conditions are satisfied:

$$1.45 < F_1/F_4 < 1.65 \tag{1}$$

$$2.5 < F_4/F_w < 2.8 \tag{2}$$

$$0.75 < |f_{5,4}/F_5| < 1.3 \tag{3}$$

$$0.47 < D_{5,6}/F_5 < 0.65 \tag{4}$$

where $F_1$, $F_4$ and $F_5$ are the focal lengths of the first, fourth and fifth lens units respectively, $F_w$ is the shortest focal length of the entire system, $f_{5,4}$ is the focal length of the fourth lens, and $D_{5,6}$ is the air separation between the third and fourth lenses.

BRIEF DESCRIPTION OF THE DRAWINGS

FIGS. 2(A), 2(B) to FIGS. 5(A), 5(B) are graphic representations of the aberrations of examples 1 to 4 of specific lenses of the invention respectively, with FIGS. 2(A), 3(A), 4(A) and 5(A) in the wide angle end, and FIGS. 2(B), 3(B), 4(B) and 5(B) in the telephoto end.

DETAILED DESCRIPTION OF THE PREFERRED EMBODIMENTS

Figure 1:
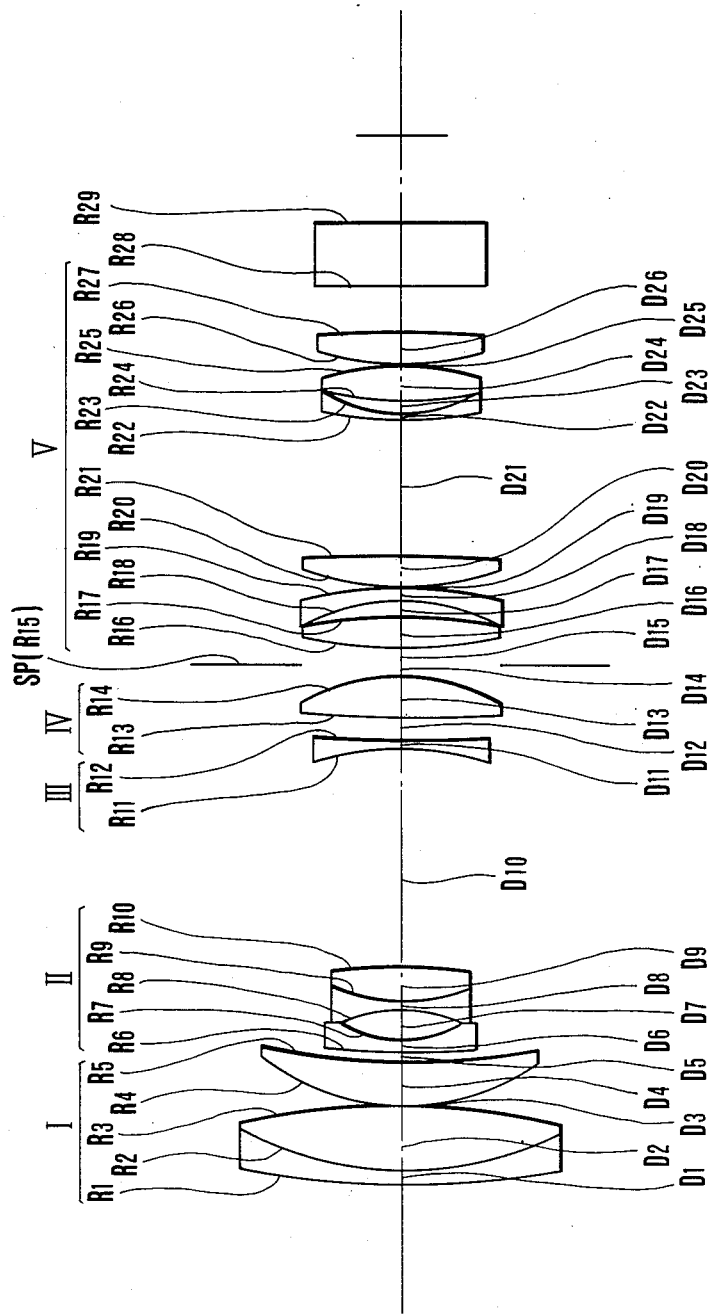
FIG. 1 is a longitudinal section view of a zoom lens concerning the invention.

In FIG. 1 there is shown a zoom lens according to the invention, comprising a first lens unit I of positive power for focusing, a second lens unit II of negative power for variation of the image magnification, a third lens unit III of negative power for compensating for the image plane that shifts as the image magnification varies, a fourth lens unit IV of positive power for making a diverging light beam from the third lens unit III to be an almost afocal light beam, and a fixed fifth lens unit V having the image forming function with a stop at SP.

In an embodiment of the invention, with such a zoom type, by setting forth the above-defined inequalities of condition (1) to (4) for the refractive powers of the individual lens units and the construction and arrangements of the constituent elements of the fifth lens unit, the aberrational problem arising from the great increases in the aperture ratio and the zoom ratio has been solved for good stability of aberration correction throughout the entire zooming range.

Particularly the residual aberrations of the image magnification varying system, for example, the spherical aberration and coma, are corrected in good balance while the total length of the lens is shortened.

The term "strong refracting surface toward the rear" as used above, means that the surface has a stronger refracting power than that of the other, in this instance, front lens surface. This applies also to the term "strong refracting surface toward the front".

The technical significance of each of the above-described conditions is explained below.

The inequalities of condition (1) represent a range for the ratio of the refractive powers of the fist and fourth lens units, and the inequalities of condition (2) represent a range for the ratio of the refractive powers of the fourth lens unit and the entire system in the wide angle end. When the refractive powers of the first and fourth lens units are so determined as to satisfy the conditions (1) and (2), a good-balanced refractive power arrangement is established over the entire lens system which enables the outer diameter of the lens to be minimized, and aberration correction to be performed with ease, while obtaining predetermined image magnifications.

When the refractive power of the fourth lens unit becomes small beyond the lower limit of condition (1), the total zooming movement of the third lens unit is much increased. To allow for this, the fourth lens unit must be put to a more rearward position. To admit of the diverging light beam from the third lens unit, therefore, the diameter of the fourth lens unit must be increased. When the refractive power of the first lens unit becomes weak beyond the upper limit, it must be put further ahead. Otherwise, the proper relationship in image magnification of it with the zoom section comprised of the second and third lens units could no longer be preserved. Therefore, the outer diameter of the first lens unit is increased objectionably.

When the refractive power of the fourth lens unit is too strong as exceeding the lower limit of condition (2), it becomes difficult to determine the image magnification of the zoom section in the wide angle end so properly that despite the shortening of the total length of the lens the second, third and fourth lens units do not mechanically interfere with each other. Further, higher order spherical aberrations, coma and other various aberrations are increased so greatly that these become difficult to correct well. When the refractive power of the fourth lens unit is too weak as exceeding the upper limit, the diverting light beam from the third lens unit is hardly made afocal. From this reason, the refractive power of the zoom section must be weakened. As a result, the total zooming movements of the second and third lens units are increased, which leads to an increase in the total length of the lens.

The inequalities of condition (3) represent a range for the refractive power ratio of the negative fourth lens to the image forming or fifth lens unit. When the refractive power of the fourth lens becomes strong beyond the lower limit, the diverging tendency of the following lenses in the fifth lens unit is strengthened to produce large higher order astigmatism. When the refractive power of the fourth lens is too weak as exceeding the upper limit, the negative distortion is increased, which becomes difficult to correct well. It is preferred that the lower limit takes 0.8 or thereabout.

The inequalities of condition (4) represent a range for the air separation between the third and fourth lenses in the fifth lens unit. When the separation is too short as exceeding the lower limit, the off-axis principal ray of light enters the fourth lens and those that follow at too low heights to well correct curvature of field. When the separation is too long as exceeding the upper limit, the diameters of the fourth lens and those that follow are increased, which in turn increases the total length of the lens objectionably.

It should be noted that the fourth lens unit in this embodiment is preferably constructed in the form of a singlet whose rear surface is convex toward the rear, for it can assist in improvement of the minimization of the total length of the lens and the aberration correction.

Next, in order to stabilize the good aberration correction against zooming, the invention sets forth additional rules of lens design. A zoom lens of the invention is constructed comprising, from front to rear, a first lens unit of positive power for focusing, a second lens unit of negative power having the image magnification varying function, a third lens unit of negative power for compensating for the image plane that shifts as the image magnification varies, a fourth lens unit of positive power for making afocal the diverging light beam from the third lens unit, and a fifth lens unit having the image forming function, the second lens unit being constructed with three lenses of which the first counting from front is a negative meniscus-shaped lens of forward convexity, the second is a bi-concave lens and the third is a positive lens whose front surface is convex toward the front, and the zoom lens satisfying the following conditions:

$$1.0 < |F_2/Fw| < 1.2 \tag{5}$$

$$1.05 < |\beta_{2T}|/Z^{\frac{1}{2}} < 1.2 \tag{6}$$

$$0.17 < \beta_{3T}/Z^{\frac{1}{2}} < 0.23 \tag{7}$$

$$2.3 < LP/Fw < 2.65 \tag{8}$$

$$53 < (\nu_{21} + \nu_{22})/2 \tag{9}$$

$$\nu_{23} < 26 \tag{10}$$

where $F_2$ is the focal length of the second lens unit, $Fw$ is the shortest focal length of the entire system, $\beta_{2T}$ and $\beta_{3T}$ are the image magnifications of the second and third lens units when in the telephoto end, Z is the zoom ratio, LP is the distance from frontmost lens surface to the entrance pupil when in the wide angle end, and $\nu_{2i}$ is the Abbe number of the glass of the i-th lens counting from front in the second lens unit.

In this embodiment, with the use of such a zoom type, when the image magnifications of the second and third lens units, the position of the entrance pupil and the selection of glasses for use in the constituent lens elements of the second lens unit satisfy the conditions (5) to (10), good stability of aberration correction is maintained over the extended zooming range at the increased aperture ratio.

The technical significance of each of the above-cited conditions is explained below.

The inequalities of condition (5) represent a range for the negative refractive power of the second lens unit to obtain the predetermined zoom ratio easily while lessening the variation with zooming of the aberrations. When the refractive power is too strong as exceeding the lower limit, although the total zooming movement of the second lens unit decreases, the aberrations vary to so large an extent as to hardly correct. When the refractive power is too weak as exceeding the upper limit, the required total zooming movement of the second lens unit for obtaining the predetermined zoom ratio increases which leads to increase the total length of the lens objectionably.

he inequalities of conditions (6) and (7) represent ranges for the ratio of the image magnifications when in the telephoto end of the second and third lens units to the zoom ratio respectively mainly to secure the desired range of variation of the image magnification with the limitation of the size of the entire lens system to a minimum.

When the image magnification of the second lens unit is too small as exceeding the lower limit of condition (6), the spacing between the second and third lens unit is so widened when in the wide angle end that the diameter of the first lens unit for focusing must be increased largely. Or otherwise, the illumination in the corners of the image frame would be difficult to secure to the predetermined level. When the upper limit is exceeded, the spacing between the second and third lens unit when in the telephoto end must be widened to avoid mechanical interference therebetween. As a result, the minimization of the total length is sacrificed.

When the image magnification of the third lens unit is too small beyond the lower limit of condition (7), the excessive increase of its negative refractive power causes the diverging tendency of the emerging light from the third lens unit to increase very largely, and therefore, the diameter of the following or fourth lens unit to increase. Conversely when the upper limit is exceeded, the negative refractive power of the third lens unit becomes too weak to avoid the total zooming movement of the third lens from increasing. This leads to increase the total length of the lens.

The inequalities of condition (8) represent a range for the location of the entrance pupil or the distance of the entrance pupil from the front vertex mainly to prevent the diameter of the first lens unit from increasing. This assists in lessening the variation of aberration with focusing.

In general, the shorter the distance of the entrance pupil, the lower the height of incidence of the off-axial ray on the first lens surface becomes, and, therefore, the smaller its diameter becomes. On the other hand, however, the diameter of the next lens unit is increased and it also becomes difficult to maintain the optical performance in good balance over the entire area of the picture frame. With these points in mind, condition (8) is introduced. When the distance of the entrance pupil is too short as exceeding the lower limit, the positive power of the first lens unit must be increased. This leads to an increase in variation with focusing of aberrations. When the upper limit is exceeded, the diameter of the first lens unit is increased objectionably. It is preferred that the upper limit is made lower to 2.6 or thereabout.

The inequalities of conditions (9) and (10) represent ranges for the Abbe numbers of the three lenses constituting the second lens unit mainly to maintain the chromatic aberrations stable against zooming. When the conditions (9) and (10) are violated, larger chromatic aberrations and particularly a large variation with zooming of lateral chromatic aberration are produced which are difficult to correct well.

The above-cited conditions when all satisfied suffice for accomplishing the objects of the invention. Yet, to achieve a further improvement of the aberration correction, it is preferred to construct the fourth and fifth lens units as follows:

The fourth lens unit has a positive lens component turning its strong refracting surface toward the rear. The fifth lens unit is constructed with, from front to rear, a bi-convex first lens turning its strong refracting surface toward the front, a negative meniscus-shaped second lens of forward concavity, a positive third lens turning its strong refracting surface toward the front, a negative meniscus-shaped fourth lens of forward convexity, a bi-convex fifth lens turning its strong refracting surface toward the rear, and a positive sixth lens turning its strong refracting surface toward the front.

The term "strong refracting surface toward the rear" herein used means that it is compared with the refracting power of the other or front lens surface. This applies to the term "strong refracting surface toward the front".

By employing such features of the fourth and fifth lens units, the residual aberrations of the zoom section, for example, the spherical aberration and the zonal aberrations such as the inward coma are entirely corrected in good balance.

Four examples of specific zoom lenses of the invention can be constructed in accordance with the numerical data given in the following tables for the radii of curvature, R, the axial thicknesses or air separations, D, and the refractive indices, N, and the Abbe numbers, $\nu$, of the glasses of the lens elements with the subscripts numbered consecutively from front to rear. R28 and R29 define a face plate, filter, etc.

The values of the factors in the above-defined conditions (1) to (10) for the numerical examples 1 to 4 are listed in Table-1.

Figure 2A:
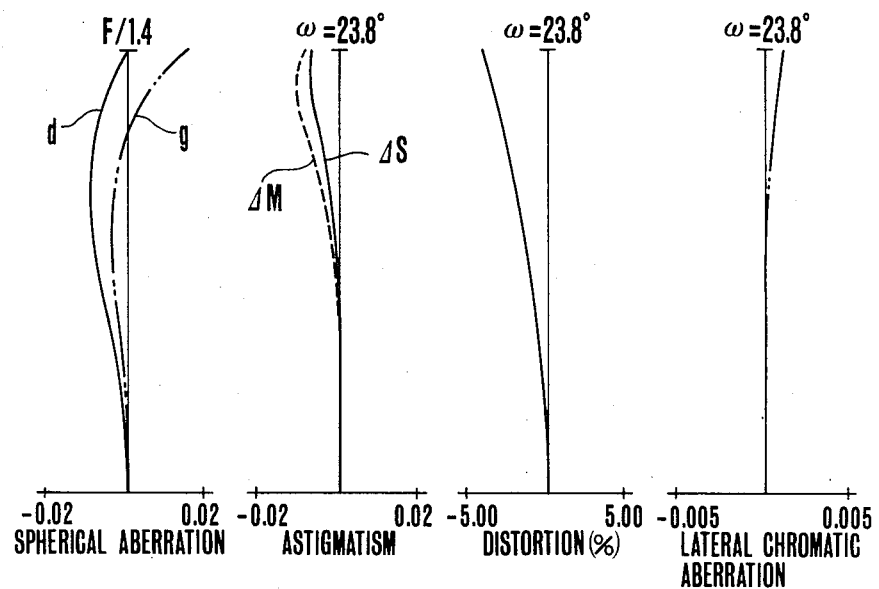
Figure 2B:
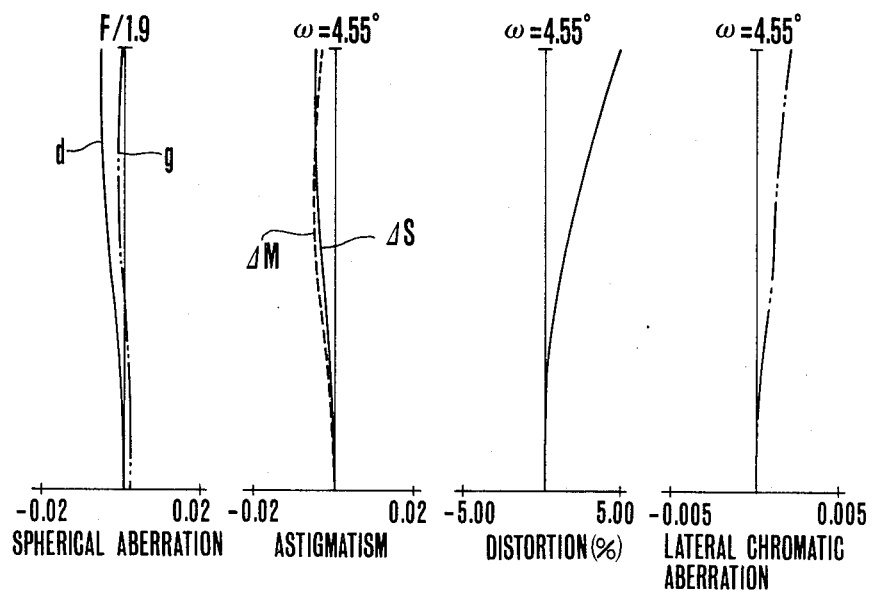

Numerical Example 1 (FIGS. 2(A) and 2(B))

| F = 1–5.6 | FNo = 1:1.4–1.9 | 2ω = 47.6°–9.1 | |
|---|---|---|---|
| R1 = 7.756 | D1 = 0.134 | N1 = 1.80518 | ν1 = 25.4 |
| R2 = 3.442 | D2 = 0.591 | N2 = 1.51633 | ν2 = 64.1 |
| R3 = −9.531 | D3 = 0.016 | | |
| R4 = 2.763 | D4 = 0.386 | N3 = 1.60311 | ν3 = 60.7 |
| R5 = 11.218 | D5 = Variable | | |
| R6 = 14.307 | D6 = 0.086 | N4 = 1.71300 | ν4 = 53.8 |
| R7 = 1.215 | D7 = 0.312 | | |
| R8 = −1.631 | D8 = 0.086 | N5 = 1.71300 | ν5 = 53.8 |
| R9 = 1.631 | D9 = 0.257 | N6 = 1.84666 | ν6 = 23.9 |
| R10 = −82.069 | D10 = Variable | | |
| R11 = −2.373 | D11 = 0.096 | N7 = 1.71300 | ν7 = 53.8 |

-continued

| | | | |
|---|---|---|---|
| R12 = −14.802 | D12 = Variable | | |
| R13 = 12.778 | D13 = 0.419 | N8 = 1.69680 | $\nu 8$ = 55.5 |
| R14 = −2.092 | D14 = 0.107 | | |
| R15 = Stop | D15 = 0.214 | | |
| R16 = 3.733 | D16 = 0.333 | N9 = 1.65844 | $\nu 9$ = 50.9 |
| R17 = −7.603 | D17 = 0.144 | | |
| R18 = −2.384 | D18 = 0.107 | N10 = 1.80518 | $\nu 10$ = 25.4 |
| R19 = −13.781 | D19 = 0.016 | | |
| R20 = 3.216 | D20 = 0.236 | N11 = 1.65844 | $\nu 11$ = 50.9 |
| R21 = 26.338 | D21 = 1.719 | | |
| R22 = 9.547 | D22 = 0.086 | N12 = 1.80518 | $\nu 12$ = 25.4 |
| R23 = 1.909 | D23 = 0.065 | | |
| R24 = 3.035 | D24 = 0.333 | N13 = 1.56384 | $\nu 13$ = 60.7 |
| R25 = −3.035 | D25 = 0.016 | | |
| R26 = 2.109 | D26 = 0.300 | N14 = 1.51742 | $\nu 14$ = 52.4 |
| R27 = −11.863 | D27 = 0.429 | | |
| R28 = ∞ | D28 = 0.591 | N15 = 1.51633 | $\nu 15$ = 64.1 |
| R29 = ∞ | | | |

| | W | T |
|---|---|---|
| D5 | 0.1334 | 2.1555 |
| D10 | 2.2631 | 0.3060 |
| D12 | 0.2014 | 0.1364 |

Figure 3A:
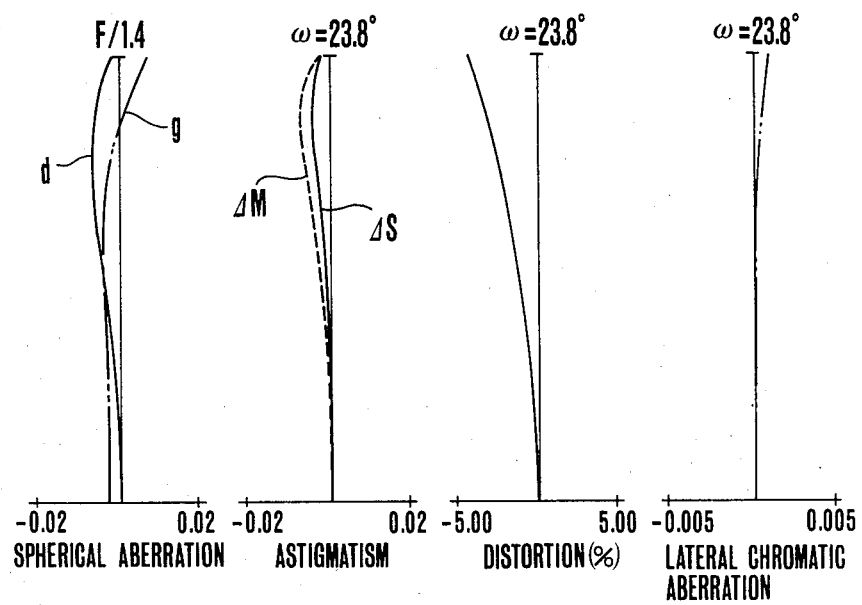
Figure 3B:
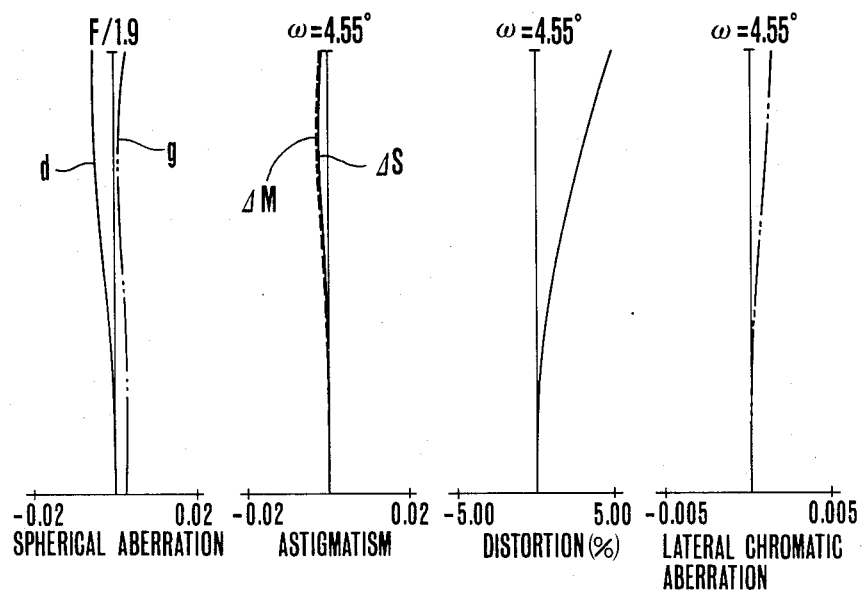

Numerical Example 2 (FIGS. 3(A) and 3(B))

| F = 1−5.6 | FNo = 1:1.4−1.9 | $2\omega$ = 47.6°−9.1° | |
|---|---|---|---|
| R1 = 8.401 | D1 = 0.134 | N1 = 1.80518 | $\nu 1$ = 25.4 |
| R2 = 3.502 | D2 = 0.612 | N2 = 1.51633 | $\nu 2$ = 64.1 |
| R3 = −7.357 | D3 = 0.016 | | |
| R4 = 2.552 | D4 = 0.397 | N3 = 1.60311 | $\nu 3$ = 60.7 |
| R5 = 7.038 | D5 = Variable | | |
| R6 = 10.093 | D6 = 0.086 | N4 = 1.71300 | $\nu 4$ = 53.8 |
| R7 = 1.206 | D7 = 0.299 | | |
| R8 = −1.503 | D8 = 0.086 | N5 = 1.71300 | $\nu 5$ = 53.8 |
| R9 = 1.503 | D9 = 0.306 | N6 = 1.80518 | $\nu 6$ = 25.4 |
| R10 = −18.283 | D10 = Variable | | |
| R11 = −2.722 | D11 = 0.096 | N7 = 1.71300 | $\nu 7$ = 53.8 |
| R12 = −68.682 | D12 = Variable | | |
| R13 = 22.343 | D13 = 0.387 | N8 = 1.71300 | $\nu 8$ = 53.8 |
| R14 = −2.035 | D14 = 0.107 | | |
| R15 = Stop | D15 = 0.215 | | |
| R16 = 5.610 | D16 = 0.290 | N9 = 1.65844 | $\nu 9$ = 50.9 |
| R17 = −6.537 | D17 = 0.176 | | |
| R18 = −2.030 | D18 = 0.107 | N10 = 1.80518 | $\nu 10$ = 25.4 |
| R19 = −5.427 | D19 = 0.016 | | |
| R20 = 3.119 | D20 = 0.268 | N11 = 1.63854 | $\nu 11$ = 55.4 |
| R21 = −20.632 | D21 = 1.397 | | |
| R22 = 5.421 | D22 = 0.086 | N12 = 1.80518 | $\nu 12$ = 25.4 |
| R23 = 1.814 | D23 = 0.115 | | |
| R24 = 4.701 | D24 = 0.311 | N13 = 1.51633 | $\nu 13$ = 64.1 |
| R25 = −2.435 | D25 = 0.016 | | |
| R26 = 2.992 | D26 = 0.279 | N14 = 1.51633 | $\nu 14$ = 64.1 |
| R27 = −7.814 | D27 = 0.430 | | |
| R28 = ∞ | D28 = 0.591 | N15 = 1.51633 | $\nu 15$ = 64.1 |
| R29 = ∞ | | | |

| | W | T |
|---|---|---|
| D5 | 0.1159 | 2.1439 |
| D10 | 2.1858 | 0.2185 |
| D12 | 0.2165 | 0.1557 |

Figure 4A:
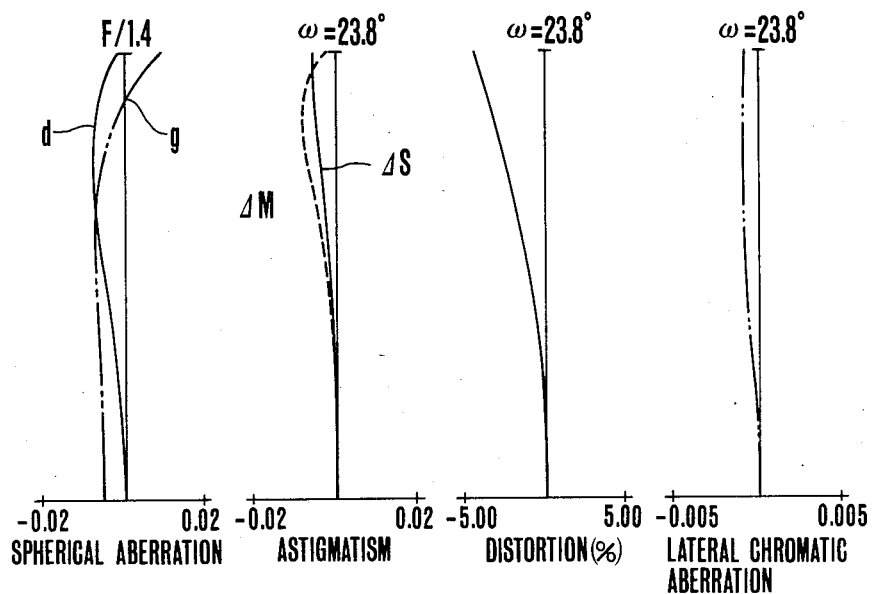
Figure 4B:
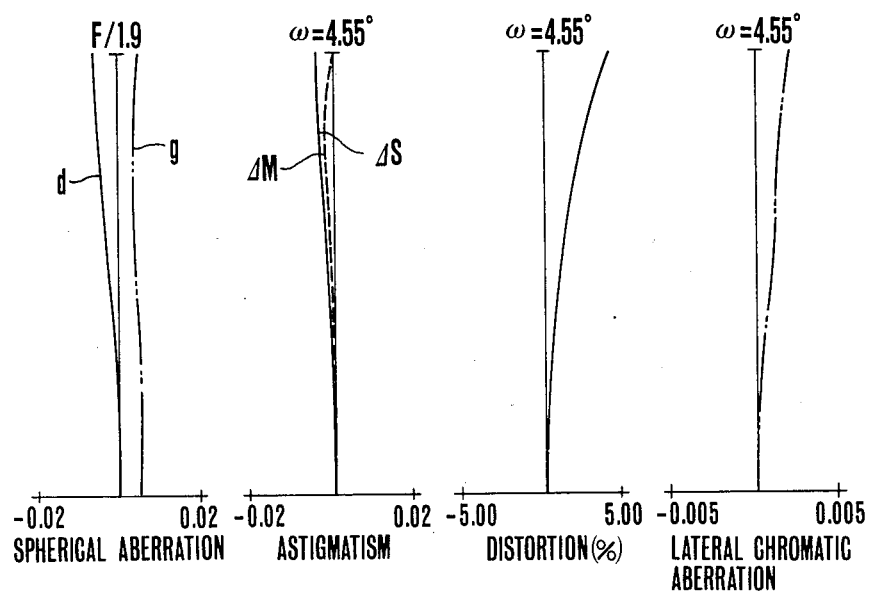

Numerical Example 3 (FIGS. 4(A) and 4(B))

| F = 1−5.6 | FNo = 1:1.4−1.9 | $2\omega$ = 47.6°−9.1° | |
|---|---|---|---|
| R1 = 7.793 | D1 = 0.134 | N1 = 1.80518 | $\nu 1$ = 25.4 |
| R2 = 3.503 | D2 = 0.569 | N2 = 1.51633 | $\nu 2$ = 64.1 |
| R3 = −10.463 | D3 = 0.016 | | |
| R4 = 2.804 | D4 = 0.397 | N3 = 1.60311 | $\nu 3$ = 60.7 |
| R5 = 12.784 | D5 = Variable | | |
| R6 = 10.092 | D6 = 0.086 | N4 = 1.71300 | $\nu 4$ = 53.8 |
| R7 = 1.247 | D7 = 0.299 | | |
| R8 = −1.632 | D8 = 0.086 | N5 = 1.71300 | $\nu 5$ = 53.8 |
| R9 = 1.720 | D9 = 0.268 | N6 = 1.80518 | $\nu 6$ = 25.4 |
| R10 = −204.843 | D10 = Variable | | |
| R11 = −2.609 | D11 = 0.096 | N7 = 1.71300 | $\nu 7$ = 53.8 |
| R12 = −33.052 | D12 = Variable | | |
| R13 = 22.168 | D13 = 0.387 | N8 = 1.71300 | $\nu 8$ = 53.8 |
| R14 = −2.037 | D14 = 0.107 | | |
| R15 = Stop | D15 = 0.215 | | |
| R16 = 4.745 | D16 = 0.268 | N9 = 1.65844 | $\nu 9$ = 50.9 |
| R17 = −8.724 | D17 = 0.190 | | |
| R18 = −2.084 | D18 = 0.107 | N10 = 1.80518 | $\nu 10$ = 25.4 |
| R19 = −5.021 | D19 = 0.016 | | |
| R20 = 3.134 | D20 = 0.268 | N11 = 1.63854 | $\nu 11$ = 55.4 |
| R21 = −48.809 | D21 = 1.397 | | |
| R22 = 5.383 | D22 = 0.086 | N12 = 1.80518 | $\nu 12$ = 25.4 |
| R23 = 1.798 | D23 = 0.115 | | |
| R24 = 4.523 | D24 = 0.311 | N13 = 1.51633 | $\nu 13$ = 64.1 |
| R25 = −2.536 | D25 = 0.016 | | |
| R26 = 2.917 | D26 = 0.279 | N14 = 1.51633 | $\nu 14$ = 64.1 |
| R27 = −6.661 | D27 = 0.430 | | |
| R28 = ∞ | D28 = 0.591 | N15 = 1.51633 | $\nu 15$ = 64.1 |
| R29 = ∞ | | | |

| | W | T |
|---|---|---|
| D5 | 0.1256 | 2.1540 |
| D10 | 2.2294 | 0.2614 |
| D12 | 0.2141 | 0.1537 |

Figure 5A:
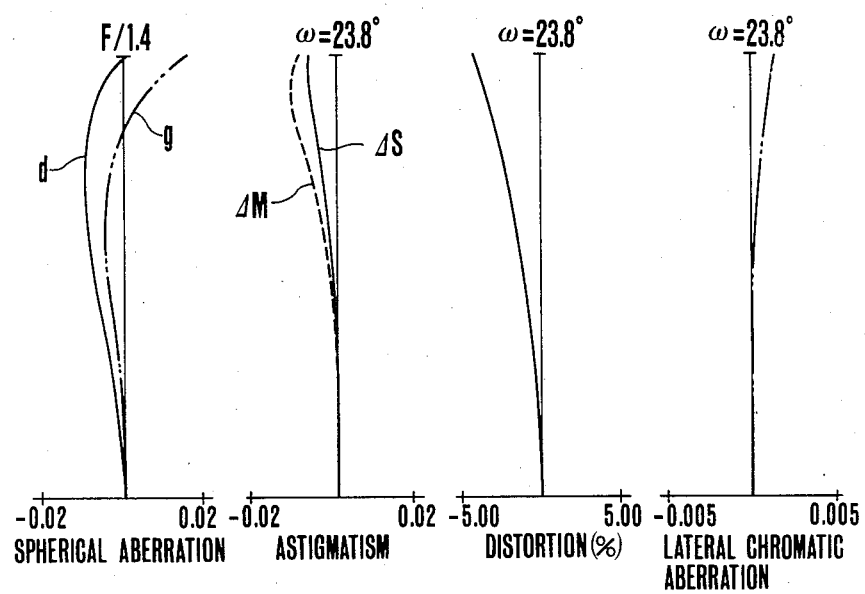
Figure 5B:
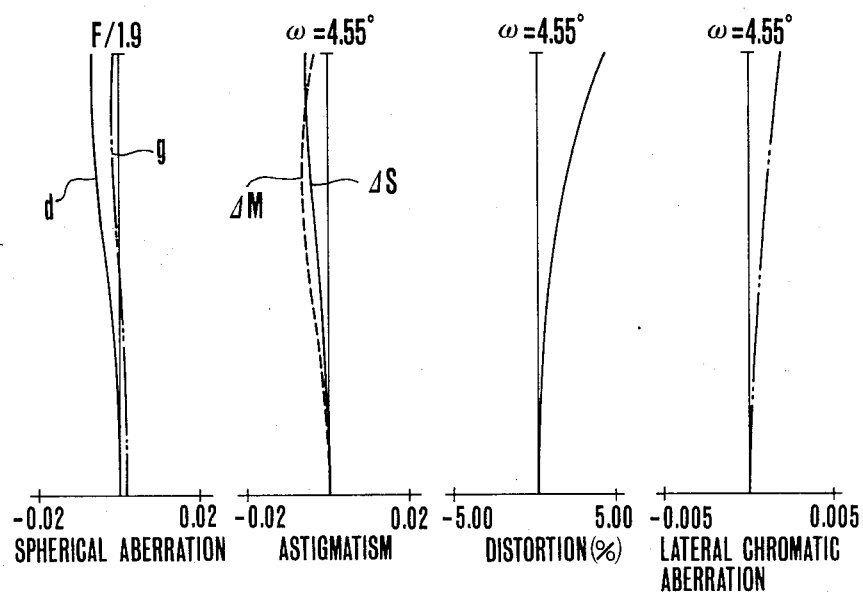

Numerical Example 4 (FIGS. 5(A) and 5(B))

| F = 1−5.6 | FNo = 1:1.4−1.9 | $2\omega$ = 47.6°−9.1° | |
|---|---|---|---|
| R1 = 7.7546 | D1 = 0.1343 | N1 = 1.80518 | $\nu 1$ = 25.4 |
| R2 = 3.4413 | D2 = 0.5908 | N2 = 1.51633 | $\nu 2$ = 64.1 |
| R3 = −9.5301 | D3 = 0.0161 | | |
| R4 = 2.7632 | D4 = 0.3867 | N3 = 1.60311 | $\nu 3$ = 60.7 |
| R5 = 11.2168 | D5 = Variable | | |
| R6 = 14.3049 | D6 = 0.0859 | N4 = 1.71300 | $\nu 4$ = 53.8 |
| R7 = 1.2157 | D7 = 0.3111 | | |
| R8 = −1.6307 | D8 = 0.0859 | N5 = 1.71300 | $\nu 5$ = 53.8 |
| R9 = 1.6315 | D9 = 0.2578 | N6 = 1.84666 | $\nu 6$ = 23.9 |
| R10 = −82.0540 | D10 = Variable | | |
| R11 = −2.3730 | D11 = 0.0967 | N7 = 1.71300 | $\nu 7$ = 53.8 |
| R12 = −14.7996 | D12 = Variable | | |
| R13 = 12.7764 | D13 = 0.4190 | N8 = 1.69680 | $\nu 8$ = 55.5 |
| R14 = −2.0921 | D14 = 0.1074 | | |
| R15 = Stop | D15 = 0.2149 | | |
| R16 = 3.7329 | D16 = 0.3330 | N9 = 1.65844 | $\nu 9$ = 50.9 |
| R17 = −7.6025 | D17 = 0.1448 | | |
| R18 = −2.3838 | D18 = 0.1074 | N10 = 1.80518 | $\nu 10$ = 25.4 |
| R19 = −13.7788 | D19 = 0.0161 | | |
| R20 = 3.2163 | D20 = 0.2363 | N11 = 1.65844 | $\nu 11$ = 50.9 |
| R21 = 26.3335 | D21 = 1.7188 | | |
| R22 = 9.5453 | D22 = 0.0859 | N12 = 1.80518 | $\nu 12$ = 25.4 |
| R23 = 1.9093 | D23 = 0.0654 | | |
| R24 = 3.0351 | D24 = 0.3330 | N13 = 1.56384 | $\nu 13$ = 60.7 |
| R25 = −3.0350 | D25 = 0.0161 | | |
| R26 = 2.1092 | D26 = 0.3008 | N14 = 1.51742 | $\nu 14$ = 52.4 |
| R27 = −11.8616 | D27 = 0.4297 | | |
| R28 = ∞ | D28 = 0.5908 | N15 = 1.51633 | $\nu 15$ = 64.1 |
| R29 = ∞ | | | |

| | W | T |
|---|---|---|
| D5 | 0.1337 | 2.1554 |
| D10 | 2.2632 | 0.3071 |
| D12 | 0.2013 | 0.1358 |

TABLE 1

| Condition | Factor | Numerical Example | | | |
|---|---|---|---|---|---|
| | | 1 | 2 | 3 | 4 |
| (1) | $F_1/F_4$ | 1.6008 | 1.5921 | 1.5922 | 1.5993 |
| (2) | $F_4/F_W$ | 2.6107 | 2.6341 | 2.6343 | 2.5229 |
| (3) | $|f_{5,4}/F_5|$ | 1.0548 | 1.2333 | 1.2207 | 0.7942 |
| (4) | $D_{5,6}/F_5$ | 0.6085 | 0.5035 | 0.5032 | 0.5433 |
| (5) | $|F_2/F_w|$ | 1.075 | 1.075 | 1.075 | 1.038 |
| (6) | $|\beta_{2T}|/z$ | 1.07 | 1.06 | 1.06 | 1.07 |
| (7) | $\beta_{3T}/z$ | 0.20 | 0.20 | 0.20 | 0.20 |

TABLE 1-continued

| Condition | Factor | Numerical Example | | | |
|---|---|---|---|---|---|
| | | 1 | 2 | 3 | 4 |
| (8) | LP/Fw | 2.61 | 2.60 | 2.60 | 2.52 |
| (9) | $(\nu_{21} + \nu_{22})/2$ | 53.8 | 53.8 | 53.8 | 53.8 |
| (10) | $\nu_{23}$ | 23.9 | 25.4 | 25.4 | 23.9 |

As has been described above, according to the invention, a zoom lens of greatly increased aperture ratio and high zoom ratio while still permitting a large reduction of the bulk and size of the entire lens system to be achieved in such a manner as to preserve a high grade optical performance, which zoom lens is very suited to photographic cameras or video cameras, can be achieved.

In particular, the present invention is to provide a compact zoom lens whose total length is shorter than was heretofore impossible, being $L = 11.2\phi_4$ to $11.6\phi_4$.

What is claimed is:

1. A zoom lens comprising, from front to rear, a first lens unit of positive refractive power for focusing, a second lens unit of negative refractive power having the image magnification varying function, a third lens unit of negative refractive power for compensating for the shift of an image plane resulting from the variation of the image magnification, a fourth lens unit of positive refractive power for making afocal the diverging light beam from said third lens unit, and a fifth lens unit having the image forming function, said fifth lens unit including, from front to rear, a first lens of which both lens surfaces are convex and which turns its strong refracting surface toward the front, a negative meniscus-shaped second lens concave toward the front, a positive third lens turning its strong refracting surface toward the front, a negative meniscus-shaped fourth lens convex toward the front, a fifth lens of which both lens surfaces are convex and which turns its strong refracting surface toward the rear, and a positive sixth lens turning its strong refracting surface toward the front, wherein the following conditions are satisfied:

$1.45 < F_1/F_4 1.65$
$2.5 < F_4/Fw < 2.8$
$0.75 < |f_{5,4}/F_5| < 1.3$
$0.47 < D_{5,6}/F_5 < 0.65$ where $F_1$, $F_4$ and $F_5$ are the focal lengths of said first, said fourth and said fifth lens units respectively, Fw is the shortest focal length of the entire system, $f_{5,4}$ is the focal length of said fifth lens, and $D_{5,6}$ is the air separation between said third and said fourth lenses.

2. A zoom lens comprising a first lens unit of positive refractive power for focusing, a second lens unit of negative refractive power having the image magnification varying function, a third lens unit of negative refractive power for compensating for the shift of an image plane resulting from the variation of the image magnification, a fourth lens unit of positive refractive power for making almost afocal the diverging light beam from said third lens unit, and a fifth lens unit having the image forming function, said second lens unit including, from front to rear, a negative meniscus-shaped first lens convex toward the front, a second lens of which both surfaces are concave, and a positive third lens turning its convex surface toward the front, wherein the following conditions are satisfied:

$1.0 < |F_2/Fw| < 1.2$
$1.05 < |\beta_{2T}|/Z^{\frac{1}{2}} < 1.2$
$0.17 < \beta_{3T}/Z^{\frac{1}{2}} < 0.23$
$2.3 < LP/Fw < 2.65$
$53 < (\nu_{21} + \nu_{22})/2$
$\nu_{23} < 26$ where $F_2$ is the focal length of said second lens unit, Z is the zoom ratio, $\beta_{2T}$ and $\beta_{3T}$ are the image magnifications when in the telephoto end of said second and said third lens units respectively, Fw is the shortest focal length of the entire lens system, $\nu_{21}$, $\nu_{22}$ and $\nu_{23}$ are the Abbe numbers of the glasses of said first, said second and said third lenses in said second lens unit, and LP is the distance from the frontmost lens surface to an entrance pupil.

* * * * *

UNITED STATES PATENT AND TRADEMARK OFFICE
CERTIFICATE OF CORRECTION

PATENT NO. : 4,812,024
DATED : March 14, 1989
INVENTOR(S) : HITOSHI MUKAIYA

It is certified that error appears in the above-identified patent and that said Letters Patent is hereby corrected as shown below:

Cover Page,

[30], lines 1 and 2, "May 11, 1987" should read --November 5, 1987--.

Column 3, line 35, "fist" should read --first--.

Column 5, line 28, "he" should read --The--.

Column 10, line 23, "its convex" should read --its stronger convex--.

Signed and Sealed this

Twenty-second Day of August, 1989

Attest:

DONALD J. QUIGG

*Attesting Officer*      *Commissioner of Patents and Trademarks*